(No Model.) 3 Sheets—Sheet 1.
T. B. SHARP.
MANUFACTURE OF METALLIC TUBULAR COILS.
No. 303,952. Patented Aug. 19, 1884.
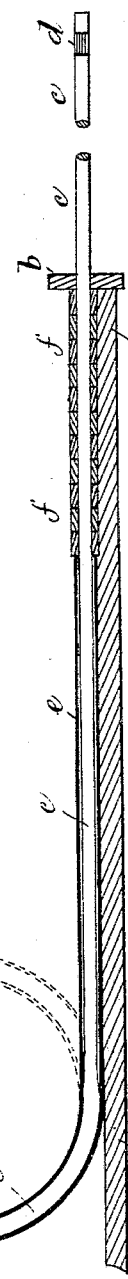
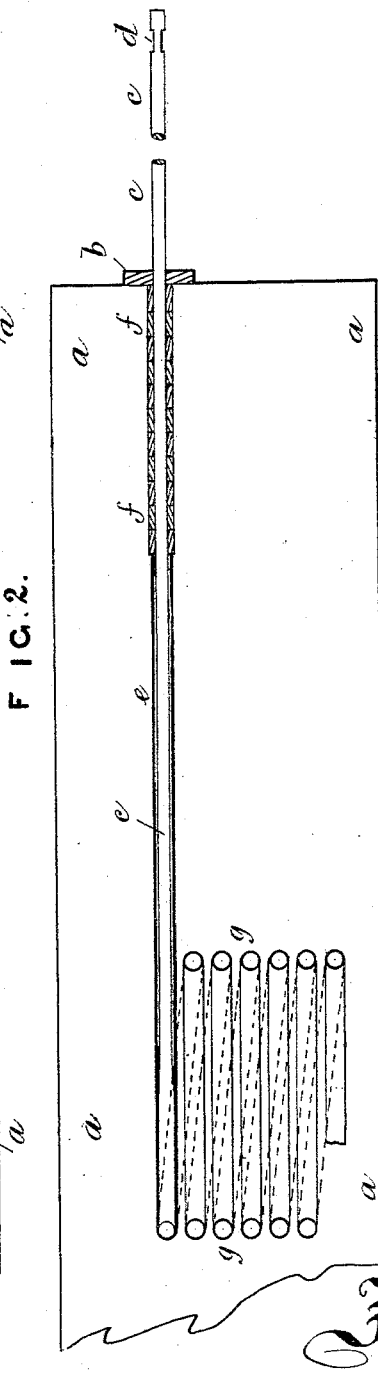
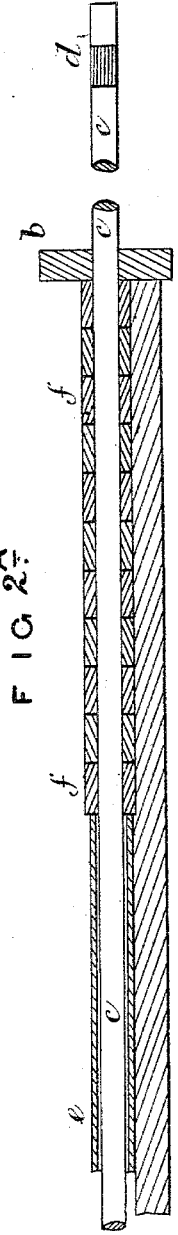
FIG.1. FIG.2. FIG.2ᴬ.
Witnesses.
George Shaw
Richard Skerrett
Inventor.
Thomas Budworth Sharp.
N. PETERS, Photo-Lithographer, Washington, D. C.

(No Model.) 3 Sheets—Sheet 2.
T. B. SHARP.
MANUFACTURE OF METALLIC TUBULAR COILS.
No. 303,952. Patented Aug. 19, 1884.
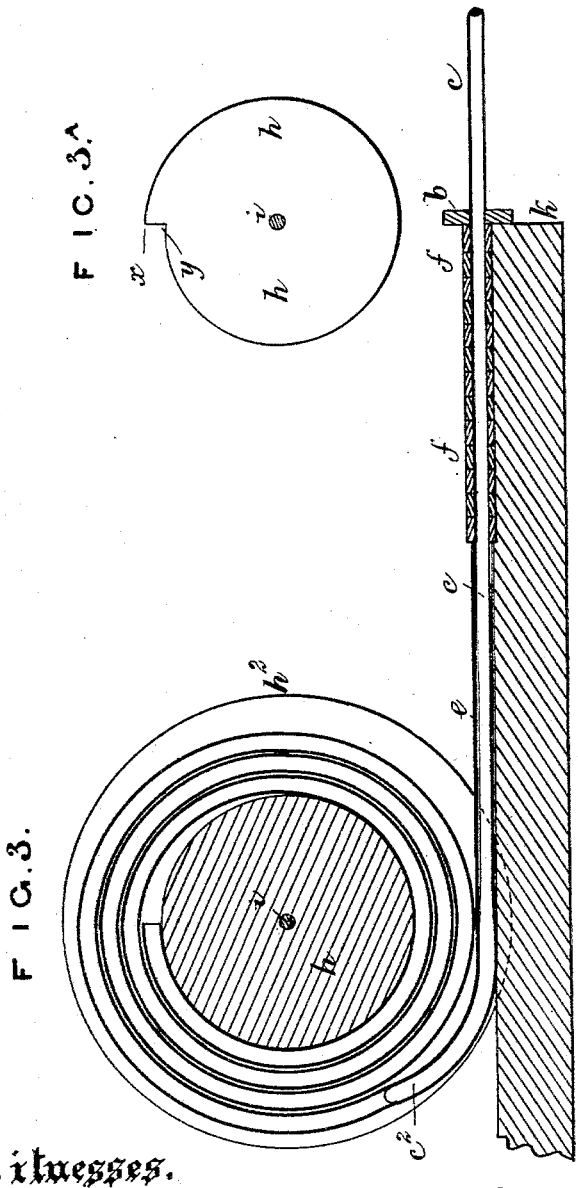
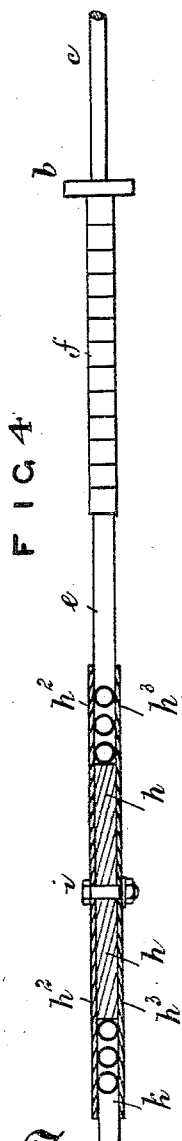
Witnesses.
George Shaw
Richard Skerrett
Inventor.
Thomas Budworth Sharp.

(No Model.) 3 Sheets—Sheet 3.
T. B. SHARP.
MANUFACTURE OF METALLIC TUBULAR COILS.
No. 303,952. Patented Aug. 19, 1884.
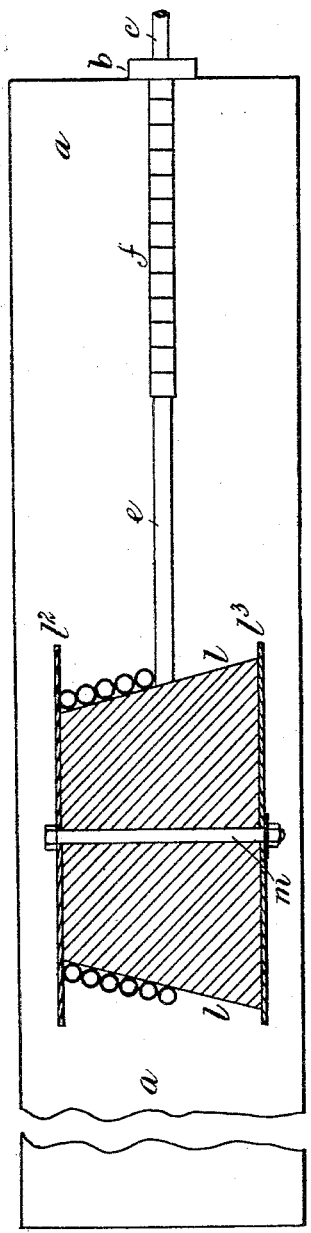
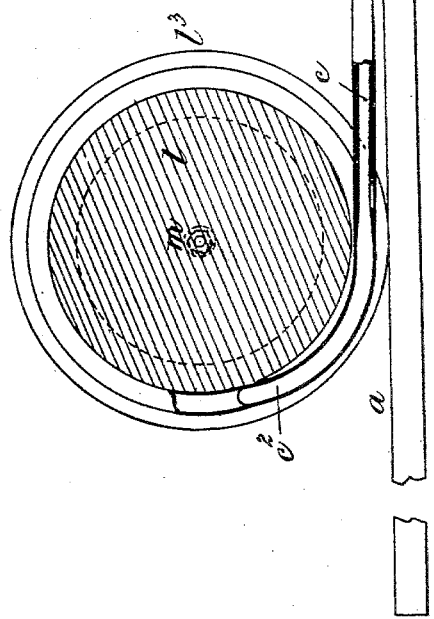
Witnesses.
George Shaw
Richard Sperrett
Inventor.
Thomas Budgwitte Sharp.

United States Patent Office.

THOMAS BUDWORTH SHARP, OF FRENCH WALLS, SMETHWICK, COUNTY OF STAFFORD, ENGLAND.

MANUFACTURE OF METALLIC TUBULAR COILS.

SPECIFICATION forming part of Letters Patent No. 303,952, dated August 19, 1884.

Application filed May 27, 1884. (No model.) Patented in England November 15, 1883, No. 5,393; in France February 1, 1884, and in Belgium February 5, 1884.

*To all whom it may concern:*

Be it known that I, THOMAS BUDWORTH SHARP, a subject of the Queen of Great Britain, residing at French Walls, Smethwick, in the county of Stafford, England, mechanical engineer, have invented certain new and useful Improvements in the Manufacture of Metallic Tubular Coils Used in Distillation and for other Purposes, and in machinery or apparatus used in the said manufacture, (for which I have received Letters Patent in Great Britain, No. 5,393, dated November 15, 1883; in France, dated February 1, 1884; in Belgium, dated February 5, 1884, and have made application for German patent, dated March 6, 1884,) of which the following is a specification.

The metallic tubular coils to which my invention principally relates are the coils of copper and tin tubing used in distillatory operations, the coils of iron tubing used for heating by steam, and other like coils used for analogous purposes. The said coils are of the same diameter throughout, and are of a helical figure. The said coils are ordinarily made from straight tubing. A piece of straight tubing is filled with lead, or rosin or sand, to prevent its collapse while under treatment, and the filled tube is bent or coiled on a cylindrical drum or other cylindrical body. After the tube has received the required helical figure the lead or rosin is melted out or the sand poured out. Where a long coil is required, two or more coils made in the way described are joined by soldering or brazing. When lead or rosin has been employed to fill the straight tube, it is not possible by fusion wholly to remove these substances, and the unremoved portions of these substances contaminate more or less the liquid condensed in the coil if the coil is used in distillation.

My invention consists in manufacturing the said coils from straight tubing by a drawing process conducted in the manner and by the use of the machinery or apparatus hereinafter described, and illustrated in the accompanying drawings.

Figure 1 represents in longitudinal section, and Fig. 2 in plan, a helical coil in course of manufacture according to my invention, the said Figs. 1 and 2 also illustrating the apparatus constituting part of my invention used in the said manufacture. Fig. $2^A$ represents a part of Fig. 1 drawn to a larger scale.

The same letters of reference indicate the same parts in Figs. 1, 2, and $2^A$.

$a$ is a strong wooden plank or table, upon which the rod or mandrel, tube, and coil are supported. $b$ is the fixed draw-back of the draw-bench, and $c\ c^2$ is the cylindrical rod or mandrel, $c$ being the straight part and $c^2$ the curved fore end. The rear end of the part $c$ of the rod or mandrel is recessed at $d$, so that it can be attached to the draw-bench wagon in the ordinary way. The curved fore end, $c^2$, of the rod or mandrel is plain and bent into the figure of about one-fourth of one of the convolutions of the coil to be made, the said curved fore end, $c^2$, being of somewhat greater diameter than the straight part $c$.

$e$ is the tube to be made into a coil, and $f$ are short tubular packing-pieces, fitting the part $c$ of the mandrel loosely, the rear packing-piece of the series bearing against the draw-back $b$ of the draw-bench. It will be seen by an examination of the drawings that the straight part $c$ of the rod or mandrel fits the tube $e$ loosely, while the curved fore end, $c^2$, of greater diameter, fits tightly the part of the tube upon which it is operating.

In manufacturing a coil according to my invention I proceed as follows: I place the rear straight part, $c$, of the rod or mandrel in the front end of the straight tube $e$, (which tube has a length somewhat less than that of the rod or mandrel,) and pass it into the tube until that part of the mandrel where the curved fore end, $c^2$, sets in comes against the front end of the tube. I then place upon the rear end of the mandrel a series of short packing-pieces, $f$. The rear end of the mandrel is then passed through the hole in the draw-back $b$, and connected at $d$ with the drawing apparatus of the draw-bench, and the mandrel is drawn through the tube, the tube being prevented from advancing on the mandrel by the packing-pieces $f$ taking a bearing against the draw-back $b$. As the curved fore end, $c^2$, of the mandrel $c\ c^2$ is drawn into the stationary tube $e$ the said curved end $c^2$ gives to the said tube its own curved figure, and as the said curved end is drawn through the whole length of the tube every part of the tube is operated upon in a similar manner, and a helical coil, $g$, thereby produced, the several convolutions of the coil being delivered from the fore end of the mandrel, nearly parallel therewith, and making a coil the axis of which is at right angles to the mandrel. During the making of the coil in the manner described the coil travels with the shortened tube by rolling upon the plank or table $a$. As the enlarged curved fore end, $c^2$, of the mandrel is drawn into the tube $e$ it slightly enlarges the internal diameter of the coiled part and gives to it a smooth and polished surface.

By using the packing-pieces $f$ between the rear end of the tube $e$ and the draw-back $b$ the curved fore end, $c^2$, of the mandrel can be drawn through the last portion of the rear of the tube, and the waste at the ends of the coil is thus reduced to a minimum.

In making an involute coil according to my invention I modify the parts of the apparatus in the manner represented in vertical section in Fig. 3 and in horizontal section (partly in edge view) in Fig. 4. The mandrel, packing-pieces, and draw-back are the same as in the first-described arrangement; but I combine with the apparatus a wooden drum, $h$, upon which the tube $e$, after it has been operated upon by the mandrel, is coiled. The said wooden drum $h$ is provided with circular disks or side plates, $h^2\ h^3$, of considerably larger diameter than the wooden drum $h$, which disks are fixed to the drum by the screw-bolt and nut at $i$. The plank or table $k$, upon which the mandrel $c\ c^2$ and other parts rest, is situated edgewise, and the circular disks $h^2\ h^3$ of the drum $h$ bear against the sides of the said plank, as seen in Fig. 4. The first convolution of the involute coil is coiled upon the drum $h$ by the action of the curved fore end, $c^2$, of the mandrel upon the tube $e$, and the next and succeeding convolutions are coiled upon one another, being confined in the space between the circular disks or sides $h^2\ h^3$ of the drum $h$, so as to produce a flat involute coil. As the convolutions are coiled upon the drum and upon one another the drum and parts carried by it advance by a rolling motion toward the draw-back $b$, the drum rising from the table or plank $k$ as the coiling operation proceeds, as will be understood by an examination of Fig. 3. After the involute coil has been made in the manner described it is drawn from the drum $h$ by removing one of the side plates or disks $h^2\ h^3$ from the said drum. The coil wound upon a drum of the kind represented in Fig. 3 has a figure sufficiently resembling an involute for general purposes; but where it is desired that the coil shall have the exact figure of an involute I make the body of the drum of the figure of an involute, as represented in Fig. 3$^A$, the distance from $x$ to $y$ being equal to the diameter of the tube. In using this drum the inner end of the coil is made to abut against the shoulder $x\ y$.

In making a conical coil according to my invention I use a conical drum, $l$, as represented in Figs. 5 and 6, the said drum having removable side plates, $l^2\ l^3$, fixed by the screw-bolt $m$. As the tube $e$ is coiled upon the drum $l$ by the action of the curved fore end, $c^2$, of the mandrel the said drum rolls along the inclined plank or table $a$, and in addition to its rolling motion has a motion at right angles to the direction of the tube being coiled—that is, as the coiling on the drum proceeds a lateral motion is given to the drum, so as to bring a different part of the drum into position to receive the next coil. The fore end, $c^2$, of the mandrel $c\ c^2$ has in this modification nearly the curvature of the smaller end of the drum $l$. By varying the shape of the drum the configuration of the coil may be varied. The drum, in cases where the coil cannot be removed from it by a sliding motion, is made in parts, which parts can be separated for the purpose of liberating the coil from the drum.

Fig. 7 represents the curved fore end of the rod or mandrel provided with bulbs $c^3$, which is the form of mandrel I employ when the internal diameter of the coil is required to be considerably greater than that of the tube operated upon, and when it is necessary or desirable that the interior of the coil should be highly polished. When, however, very thin tubing is operated upon, the plain or unbulbed mandrel, hereinbefore described and represented, should be used in preference to the bulbed mandrel, Fig. 7.

When a coil is produced in the manner described and represented with respect to Figs. 1 and 2, it has the figure of a compact helix, the convolutions of which touch or nearly touch each other. When it is wished to produce an elongated coil or helix, it may be done by taking the compact helix, Fig. 2, attaching one end to a fixed support and drawing out the other end in the direction of the axis of the coil. In this way the helix may be lengthened to such an extent, where required, that the coil differs little from a straight tube; or an elongated helix may be produced directly from the straight tube by employing a mandrel the terminal or acting part of which has the curvature similar to that which it is desired to give the tube.

I have described and represented the method of manufacture and the machinery and apparatus which I commonly employ, and which I find answer well in practice; yet I wish it to be understood that I do not limit myself to the machinery or apparatus described and represented, as any machinery or apparatus by which the mandrel may be drawn through the tube or the tube pushed off the curved end of the mandrel may be employed. In the case of small tubes of thin metal the mandrel may be drawn through the tube by hand; or the mandrel may be fixed and the tube drawn or pushed off the mandrel by the application of pressure in the required direction on a plain part of the tube.

Having now described the nature of my invention and the manner in which the same is to be performed, I wish it to be understood that I claim—

1. The improvement in the art of manufacturing tubular coils used in distillation and for other purposes, consisting in drawing through a straight length of tubing a rod or mandrel curved at one end, substantially as described.

2. The mandrel for converting a straight metal tube into a helical or other coil, the same having one end curved, substantially as and for the purposes described.

3. A rod or mandrel for manufacturing metallic tubular coils, having a curved end and an enlargement on the curved portion, substantially as and for the purposes described.

4. The mandrel for imparting a curved shape to the tubing jointly with the drum for receiving the same, substantially as described.

5. The apparatus for manufacturing tubular coils, comprising the bench or table, the fixed draw-back thereon, and the rod or mandrel having a curved end, substantially as described.

6. The apparatus for manufacturing tubular coils, comprising a work bench or table, a fixed draw-back, a rod or mandrel having a curved end, and a drum, substantially as described.

7. The apparatus for manufacturing tubular coils, comprising a table, fixed draw-back thereon, rod or mandrel with curved end, and packing-pieces surrounding said mandrel and having a bearing against said draw-back, substantially as described.

8. The mandrel having a curved end jointly with the conical drum, substantially as described.

THOMAS BUDWORTH SHARP. [L. S.]

Witnesses:
GEORGE SHAW,
RICHARD SKERRETT.